Nov. 1, 1932.     A. REDLER     1,885,946
SELF CLEANING CHAIN
Filed Feb. 13, 1926     2 Sheets-Sheet 1
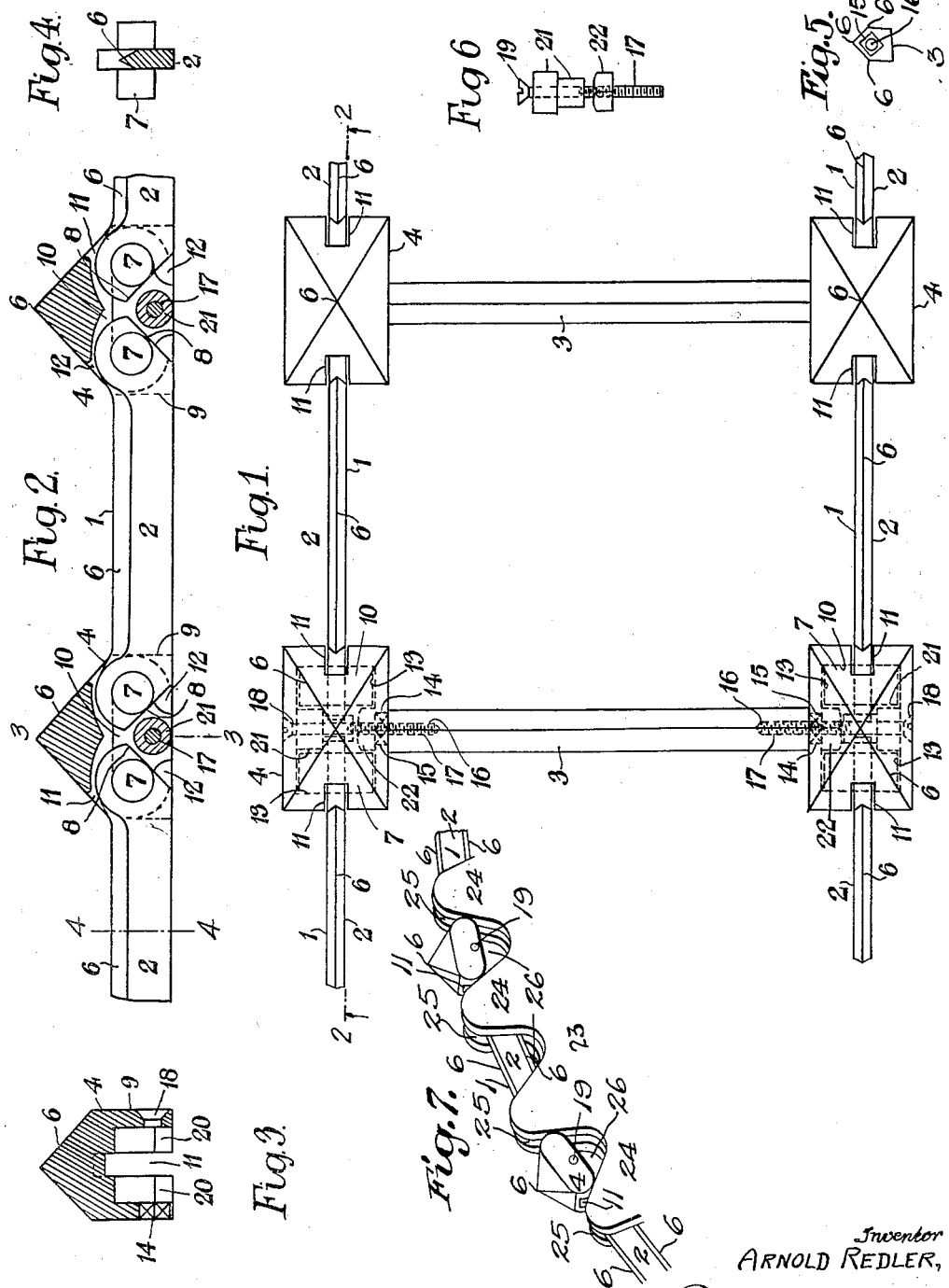
Inventor
ARNOLD REDLER,
By Daulmin Daulmin
Attorneys Nov. 1, 1932.  A. REDLER  1,885,946
SELF CLEANING CHAIN
Filed Feb. 13, 1926  2 Sheets-Sheet 2
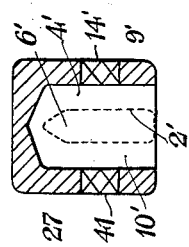
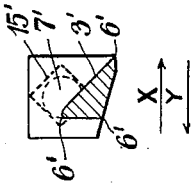
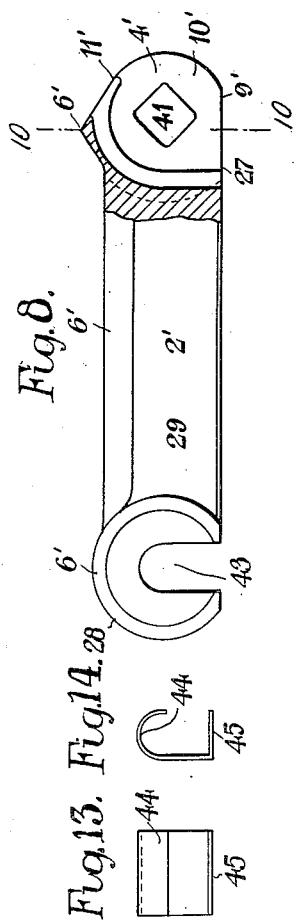
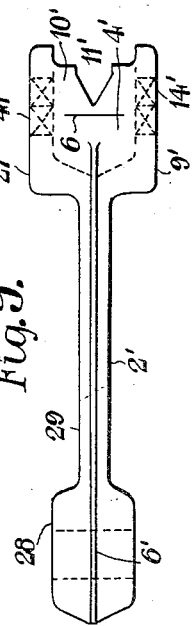
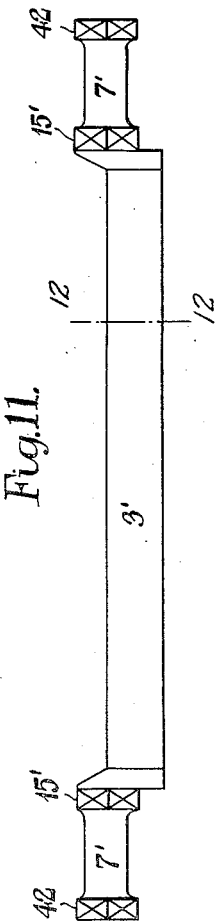
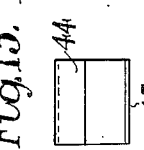
Inventor
ARNOLD REDLER,
By Toulmin & Toulmin,
Attorneys Patented Nov. 1, 1932

1,885,946

UNITED STATES PATENT OFFICE

ARNOLD REDLER, OF SHARPNESS DOCKS, ENGLAND, ASSIGNOR TO REDLER CONVEYOR COMPANY, OF QUINCY, MASSACHUSETTS, A CORPORATION OF MASSACHUSETTS

SELF-CLEANING CHAIN

Application filed February 13, 1926, Serial No. 88,124, and in Great Britain February 18, 1925.

This invention relates to self-cleaning chains adapted for use in conveyors, and particularly to conveyor chains adapted to move loose material in bulk through a trough or casing, for example, as shown in my prior Patents 1,416,416; in 1,475,596 and in 1,697,963.

The invention has for its object generally an improved construction and arrangement of parts which is efficient, economical and readily manufactured.

More specifically, it is an object to provide a structure for link-frames in conveyor chains which is composed of elements that are not flat edged or flat topped, but are especially constructed, so as to avoid collecting or retaining the material being transported.

It is a further object to provide a construction of the character indicated in which the frame elements have their upper portions terminating in substantially plane surfaces inclined obliquely to the plane of the frame so that material falling upon the same gravitates away thereby avoiding undue pressure on the parts and imparting self-cleaning characteristics to the moving elements as a whole.

It is also an object to provide a frame structure for conveyor chains in which the articulation is especially protected by means of housings that employ obliquely inclined surfaces of the character above indicated whereby the joints as well as the frames are made to have non-resistant and self-cleaning characteristics.

Other objects of the invention will in part be obvious and will in part appear hereinafter.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 1 is a fragmentary plan view showing a link-frame for a conveyor chain constructed in accordance with the invention;

Fig. 2 is a side view of the same, parts being shown in section, the section being taken on the line 2—2 in Fig. 1;

Fig. 3 is a sectional view taken on the line 3—3 in Fig. 2;

Fig. 4 is another sectional view taken on the line 4—4 in Fig. 2;

Fig. 5 is an end elevation of a transverse member or crossbar;

Fig. 6 is a detail view showing the means here employed for securing the end of a transverse member or crossbar to the side bars;

Fig. 7 is a fragmentary perspective view showing the engagement of side-bars on one side of a chain with its complemental sprocket wheel;

Fig. 8 is a view partly in section and partly in elevation of a link for a modified form of chain constructed in accordance with the invention;

Fig. 9 is a plan thereof;

Fig. 10 is a cross section on the line 10—10 in Fig. 8;

Fig. 11 is an elevation of a transverse member or crossbar complementary to the link represented in Figs. 8, 9 and 10;

Fig. 12 is a transverse section thereof on the line 12—12 in Fig. 11;

Fig. 13 is a side elevation of a fitting associated with the arrangement shown in Fig. 2, or with that shown in Fig. 8; and Fig. 14 is an end elevation thereof.

Referring to the drawings, and particularly to Figs. 1 and 2, 1 denotes generally a four-sided frame of a chain link composed of a pair of links or sidebars 2, transverse members or crossbars 3, and housings 4 disposed at the junctures of bars 2 and 3; the housing being generally rectangular in plan and provided with a superstructure 6.

A superstructure of the character here illustrated is formed by bevelling the sides of a housing 4 in the upper portion preferably on all four of its lateral faces thereby providing a pyramid terminating in a sharp point. The degree of sharpness can, of course, be varied so long as obliquely inclined surfaces accrue. The tip however may be rounded off, while the slope or inclination of the sides may be substantially that of the angle of repose for the material being conveyed, since the vibration inherent in the chain when operating exercises an effect tending to displace any material resting thereon. It is preferred, however, whatever design is adapted that all horizontal parts, and all opposing or crevice-forming surfaces tending to retain material, or tending to form pockets be made self-cleaning. To this end the bars 2 and 3 also have their upper portions terminated by substantially plane surfaces disposed obliquely to the general plane of the frame, the surfaces being positioned to form a sharp top ridge.

In order that the superstructure 6 may not be damaged or blunted when a bar 2 is passing over a sprocket wheel, such as shown at 23 in Fig. 7, it is so located with respect to the wheel as not to make direct contact therewith or otherwise bear directly thereon. The wheels to be used as sprockets are formed with relatively deep grooves between the teeth to accommodate the lower part of the housing 4 and, if desired, such grooves may be adapted to exercise a sharpening effect upon it.

The links or bars 2 here employed are of substantially uniform thickness throughout, and are similarly formed at each end to provide an eye for the frictional reception of the pivotal pin 7, a part being cut away at the side tangentially to the eye, or diagonally, as shown at 8 in Fig. 2. This cutting-away is to permit a link to be so manipulated when inserted in place in the housing 4 that it may be readily slipped over the portion of pin 7 therein that is arranged for pivotal engagement. The pin 7, instead of being separate from the link or bar 2, may be integral therewith. The adjacent ends of the two successive bars 2 are separately pivoted within a housing 4 in the manner clearly represented in Figs. 1, 2 and 3, where it will be seen that housing 4 consists of an element having a rectangular base portion 9 open at the bottom. The inside of the base portion 9 is generally fashioned to form a chamber 10, each end wall being bifurcated or slotted vertically preferably near the centre as shown at 11 to provide a place of entrance for the end of a link 2. Each end is formed with a lug or ridge 12 intervening between a side wall and a contiguous side of the slot 11 so that at each end a recess 13 obtains for the reception and retention of the ends of the pivotal pin 7. The inner side of the base portion 9 is formed with a square recess 14 for the reception of a correspondingly formed end 15 of a crossbar 3, this end being provided with a threaded hole 16 for the reception of a screw 17, shown in detail in Fig. 6. The base portion 9 is provided at its outer side with a counter-sunk hole 18 for the reception of the head 19 of the screw 17, and also has recesses 20 for the reception of two ferrules 21 and a nut 22, associated with the screw 17. This screw as here employed performs two functions, namely, to connect positively the transverse member or crossbar 3 with the side bar 2 through the agency of the housing 4, and to prevent the pin 7 from slipping completely out of the housing 4; the ferrules 21, constituting supports for the screw 17.

The ends of the bars or links 2 are associated within the housing 4 by inserting them together with the pins 7 through the open bottom of the base portion 9 and through the slot 11, and thereafter manipulating them to bring the pins 7 into the recesses 13 and in abutting relation with the ridges 12; the cut-away portion 8 admitting of the ends passing one another.

A preferred construction of crossbar 3, which has the self-cleaning property described, is exemplified in Fig. 5 where it is seen to be polygonal in cross-section and cooperates with the superstructure 6 in providing an extension of the framework which has sloping or inclined surfaces. The crossbar 3 thus provided is assembled with the housing 4 by inserting its ends 15 into the recess 14, and applying the screw 17 by way of the hole 18 and threading it through the ferrules 21 and nut 22, which latter are introduced through the open bottom of the portion 9, and finally into the hole 16. It will thus be seen that the bars or links 2 as well as crossbars 3, can be readily assembled and disassembled relatively to housings 4 for repair, or for the end-to-end reversal of a cross-bar 5.

The complete assemblage of the framework of the chain and its mounting on a sprocket wheel is shown at 23 in Fig. 7. This wheel, as here shown, is provided with teeth 24 which may be bifurcated as depicted at 25 for the reception of the side bars and with grooves 26 large enough for the reception of the housings 4. The tips of the teeth 24 may be bevelled if desired to produce the self-cleaning effect in the sprocket.

The bottom of the chamber 10 in the housing 4 may be provided with a device in the form of an appropriately shaped fitting of the character illustrated in Figs. 13 and 14 secured in position by the screw 17. This fitting may be designed either to exclude material from the chamber 10, to retain lubricant, to serve as a slipper to take the wear of the bars 2 when travelling, or to discharge two or more of these functions simultaneously. When serving as a slipper, the fitting may, with advantage, be made of manganese steel.

Referring now to the modification shown in Figs. 8 to 12, here a form of link or side-bar is illustrated in which the housing is formed integrally therewith and the cross-bar made removable, but arranged to interlock with the pivot means of the links when in place.

In Figs. 8 and 9, the side-bar shown generally at 2', has enlarged ends 27 and 28 united by an upstanding flat web 29. The end 27 is in the form of an enlarged shell adapted to serve as a housing 9' having a chamber 10', the bottom of which is open, and the end wall slotted vertically as shown at 11' to receive the complemented end of an adjacent link. The top of the housing is formed with sloping surfaces to provide a pointed superstructure 6' in the manner employed in connection with the first form of the invention.

The side walls of this housing are provided with oppositely disposed square holes disposed at 14' and 41 respectively, which are adapted to receive and hold against rotation the square ferrules 15' and 42 formed integrally on the pin 7'. This pin, as in the first form of the invention, when in place serves as the means of articulation and is engaged by the complemental end 28 of the link projecting through the opening 11'.

The complemental end 28, as here shown, is a perforated enlargement which has one side cut away as shown at 43 forming a hook-member adapted for detachable engagement with a pin 7' when in place in a housing 9'. This end is also suitably rounded off so as to fit snugly in the chamber 10', but at the same time has sufficient clearance so as to turn freely therein. The fitting shown in Figs. 12 and 13, referred to above in connection with the first form of the invention is also preferably employed in connection with this form. Accordingly the fitting is shown provided with a curved upper portion 44 adapted to fit in the top of the cut-away opening 43 and a lower flat portion 45 bent back sharply from a side so as to form a slipper closing off the opening 43 when in place. The other side of this fitting is left sufficiently open so that it will slip over a pin 7'. When a chain having links of this construction is in operation, the fitting is seen to function as a bushing for the pin 7' in the opening 43.

While the pins 7' may be separable from the transverse member, as in the first form of the invention, it is preferable in this form to form the pins 7 integrally with the cross-bar and to provide the same as an extension of the transverse member. A transverse member of this construction is shown in Fig. 11 where the bar portion proper is shown at 3', having offset ends terminating in pins 7' adapted to extend into the interlock with housings on the link ends when engaged by the hook-members of ends 28.

In this form of the invention the cross-bar preferably has its upper edges terminating in sloping surfaces to import self-cleaning effects. In cross-section such cross-bar is therefore polygonal though not necessarily symmetrical with respect to a vertical line as in the case shown in Fig. 5, since by adapting an unsymmetrical arrangement, additional effects may be accomplished, for example, a so-called "floating" or "digging" effect. An unsymmetrical arrangement is illustrated in the cross-section shown in Fig. 12. Here the section is an unequal sided triangle, which has its longest side lying in a cross-bar face which is obliquely inclined to the direction of motion of the conveyor chain. A sharp lower edge is thus presented to the material being conveyed when the motion is in the direction denoted by the arrow $x$ which produces the digging effect. The opposite face of this form of cross-bar is seen to be substantially vertical so that when moving into material in the direction denoted by the arrow $y$, a slightly rising or floating effect is produced in the chain. By arranging half the cross-bars in one direction and the remainder in the other direction, a substantially neutral effect may be achieved. Other effects may be achieved by arranging cross-bars of this character in still other ratios.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. In a conveyor chain, the combination comprising articulated frames formed of side-bars and cross-bars, and housings associated with said frames at the junction of said side-bars and cross-bars, the upper portions of said side-bars, cross-bars and housings being terminated with substantially plane surfaces inclined obliquely with respect to the plane of the frame.

2. In a conveyor chain, the combination comprising articulated frames formed of side-bars and cross-bars, and housings associated with said frames at the juncture of said side-bars and cross-bars, the upper portions of said side-bars and housing being terminated with substantially plane surfaces inclined obliquely with respect to the plane of the same and intersecting therewith in a line parallel to the direction of motion.

3. In a conveyor chain, the combination comprising articulated frames formed of side-bars and cross-bars, and housings associated with said frame of the juncture of said side-bars and cross-bars, the upper portion of said side-bars and housings being terminated with substantially plane surfaces obliquely inclined with respect to the plane of the frame, the upper portion of said cross-bars being similarly terminated with substantially plane surfaces which are disposed to provide a cross-bar section that is unsymmetrical with respect to a line penpendicular to the plane of the frame.

4. In a conveyor chain, the combination comprising articulated frames formed of housings having rectangular bases provided with open-bottomed chambers, cross-bars arranged to join together the housings on opposite sides of the frame, articulating pins arranged to enter said housings through said bottoms, and side-bars projected through end walls of said housings and provided with hooked ends for engaging with said pins when in place.

5. In a conveyor chain, the combination comprising articulated frames formed of housings having rectangular bases provided with pyramidal superstructures, detachable cross-bars in the sides of said bases, articulating pins disposed in said bases, and side-bars provided with hooked ends arranged to extend into said bases and engage detachably with said pins.

6. In a conveyor chain, the combination comprising articulated frames formed of housings having open-bottomed chambers therein, cross-bars arranged to join together a pair of housings on opposite sides of a frame articulating pins extending across said chambers, side-bars having hooked ends arranged to enter said chambers at an end and engage detachably with said pins, and fittings disposed in the hook-portion of said ends each having an upper curved portion serving as a bushing for said pin and a horizontal flat portion serving as a closure for said hook-portion.

7. In a conveyor chain, the combination comprising articulated frames formed of side-bars having dissimilar ends one of which is enlarged to form a housing, the other being provided with a perforation cut away at a side and shaped to enter a housing with sufficient clearance to turn therein, and cross-bars having end-extensions in the form of pins adapted to be fitted into said housings at the sides and serve as the articulating means with which said perforated ends engage.

8. In a conveyor chain, the combination comprising articulated frames formed of side-bars having dissimilar ends one of which is enlarged to form a housing, the other being provided with a perforation cut away at a side and shaped to enter a housing with sufficient clearance to turn therein, and cross-bars having end-extensions in the form of pins adapted to be fitted into said housings at the sides and serve as the articulating means with which said perforated ends engage, said bars and housings having their upper portions terminated with substantially plane surfaces inclined obliquely with respect to the plane of the frame.

In testimony whereof, I affix my signature.

ARNOLD REDLER.